United States Patent Office 3,759,902
Patented Sept. 18, 1973

3,759,902
METHINE DYESTUFFS
Hans-Peter Kuhlthau and Klaus-Friedrich Lehment, Leverkusen, Germany, assignors to Bayer Aktiengesellschaft, Leverkusen, Germany
No Drawing. Filed Aug. 17, 1971, Ser. No. 172,586
Claims priority, application Germany, Aug. 17, 1970, P 20 40 652.4
Int. Cl. C09b 23/00
U.S. Cl. 260—240.8    10 Claims

ABSTRACT OF THE DISCLOSURE

Methine dyestuffs, processes for their manufacture and their use of dyeing and printing of polyacrylonitrile, copolymers of acrylonitrile with other vinyl compounds, acid modified aromatic polyesters, acid modified polyamides, leather, tanned cotton, cellulose, polyurethanes and for the production of writing liquids and stamping inks.

---

The subject of the invention are methine dyestuffs of the formula

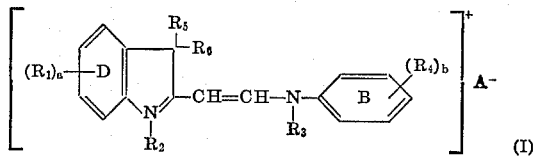

(I)

wherein $R_1$ represents halogen, lower alkyl, cycloalkyl, alkoxy, nitro, carbalkoxy, nitrile, acyl, acylamino, carboxylic acid amide, carboxylic acid alkylanilide, sulphonic acid amide, alkylsulphonyl, arylsulphonyl, carboxylic acid alkylamide, sulphonic acid alkylamide, trifluoromethyl or aralkyl and $R_4$ represents halogen, lower alkyl, cycloalkyl, alkoxy, nitro, carbalkoxy, nitrile, acyl, acylamino, amino, carboxylic acid amide, carboxylic acid alkylanilide, sulphonic acid amide, alkylsulphonyl, arylsulphonyl, carboxylic acid alkylamide, sulphonic acid alkylamide, trifluoromethyl or aralkyl, with at least one of the substituents $R_1$ and $R_4$ representing aralkyl, $R_2$ represents hydrogen, lower alkyl, cycloalkyl, aralkyl or aryl, $R_3$ represents hydrogen or lower alkyl, which can, where appropriate, close a 5-membered or 6-membered ring by joining to the adjacent position of the aryl ring B, it being possible for this heterocyclic 5-membered or 6-membered ring, thus formed, to be alkyl-substituted or condensed with a further carbocyclic ring, $R_5$ represents lower alkyl, aralkyl or cycloalkyl, $R_6$ represents lower alkyl, aralkyl or cycloalkyl, $a$ represents the numbers 0, 1, 2 or 3, $b$ represents the numbers 0, 1, 2 or 3 and $A^-$ represents an anion, and wherein the aromatic carbocyclic rings of the dyestuff can contain further non-ionic substituents, such as, for example, chlorine, bromine or fluorine atoms, or ethyl, methyl, methoxy, carbomethoxy, nitro or nitrile groups, and the rings B and D can be condensed with carbocyclic rings.

Aralkyl can be substituted in the aromatic radical, especially by lower alkyl, halogen, nitrile, nitro, hydroxyl, lower alkoxy acylamino and/or carbalkoxy.

A further subject of the invention are processes for their manufacture, and dyestuffs obtainable in accordance with the process. The invention also relates to the use of the dyestuffs for dyeing and printing.

Possible lower alkyl groups are, for example: methyl, ethyl, n-propyl, iso-propyl, n-butyl, iso-butyl, tertiary-butyl and iso-amyl.

Halogen represents fluorine, chlorine or bromine. Lower alkoxy for example represents methoxy, ethoxy, n-propoxy, iso-propoxy and n-butoxy.

Alkylsulphonyl for example represents methylsulphonyl or ethylsulphonyl, and arylsulphonyl for example represents phenylsulphonyl.

Alkoxy represents lower alkoxy and also larger radicals, for example n-undecyloxy or n-dodecyloxy. Carbalkoxy in particular represents carbomethoxy, carboethoxy, carbo-n-propoxy, carbo-isopropoxy and carbo-n-butoxy.

Suitable acyl radicals are, in particular, formyl, acetyl, n-propionyl, iso-propionyl, toluyl and benzoyl.

Suitable acylamino radicals are formylamino, acetylamino, n-propionylamino, benzoylamino, 4-chloro-benzoylamino and 4-methyl-benzoylamino.

Possible aralkyl radicals are, for example: phenylmethyl, p-phenylethyl, γ-phenylpropyl, phenylpropyl-(2,2) and, where appropriate, their derivatives which are substituted in the phenyl nucleus.

As cycloalkyl, cyclohexyl is of particular importance.

Aryl represents carbocyclic aromatic structures with 6–10 carbon atoms, such as phenyl and naphthyl, and their substitution products.

Carboxylic acid alkylanilide in particular represents carboxylic acid methylanilide or carboxylic acid ethylanilide.

Carboxylic acid alkylamide for example represents carboxylic acid methylamide, carboxylic acid N,N-dimethylamide, carboxylic acid ethylamide and carboxylic acid N,N-diethylamide.

Sulphonic acid alkylamide radicals are, for example, sulphonic acid methylamide, sulphonic acid N,N-dimethylamide, sulphonic acid ethylamide and sulphonic acid N,N-diethylamide.

As anionic radicals $A^-$, the organic and inorganic anions which are customary for basic dyestuffs can be used, and as examples there may be mentioned: chloride, bromide, iodide, carbonate, bicarbonate, $CH_3SO_4^-$, $C_2H_5SO_4^-$, p-toluenesulphonate, $HSO_4^-$, $SO_4^{--}$, disulphate, aminosulphonate, methanesulphonate, benzenesulphonate, p-chlorobenzenesulphonate, dihydrogen phosphate, phosphate, phosphomolybdate, phospho-tungstomolybdate, acetate, chloroacetate, formate, propionate, lactate, crotonate, benzoate, $NO_3^-$, perchlorate, $ZnCl_3^-$, the anions of saturated or unsaturated aliphatic dicarboxylic acids such as malonic acid, maleic acid, citric acid, tartaric acid, oxalic acid, itaconic acid, succinic acid, glutaric acid, adipic acid, pimelic acid and subceric, acid, as well as the anions of further organic monobasic acids with 4–30 carbon atoms. Colourless anions are preferred; for dyeing from an aqueous medium, those anions which do not excessively impair the solubility of the dyestuff in water are preferred. For dyeing from organic solvents, those anions which assist the solubility of the dyestuff in organic solvents or at least do not affect it adversely are also frequently preferred.

A preferred group within the dyestuffs according to the invention are those of the general formula

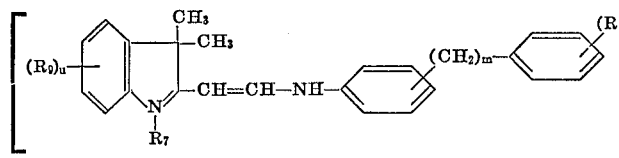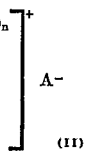

(II)

wherein

R₇ represents methyl, ethyl or benzyl,

R₈ represents identical or different methyl, ethyl, hydroxyl, methoxy, ethoxy, acetylamino, benzoylamino or nitro groups or chlorine atoms, R₉ represents identical or different methyl, ethyl, cyclohexyl, methoxy, ethoxy, dodecyloxy, acetylamino, nitro, carbomethoxy, carboethoxy, carboxylic acid amide, carboxylic acid methylanilide, carboxylic acid ethylanilide, sulphonic acid amide, methylsulphonyl, phenylsulphonyl, nitrile or trifluoromethyl groups and/or chlorine, bromine or fluoride atoms, m represents the numbers 1 or 2, n represents the numbers 0, 1, 2 or 3.

u represents the numbers 0, 1, 2 or 3 and

A⁻ represents an anion.

A further preferred group within the dyestuffs according to the invention are those of the general formula

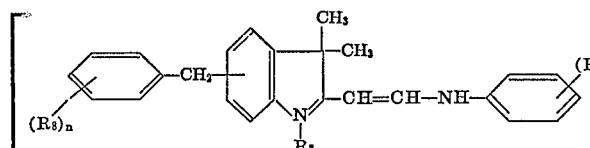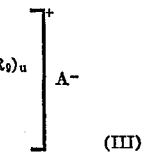

wherein

R₇ represents methyl, ethyl or benzyl,

R₈ represents identical or different methyl, ethyl, hydroxyl, methoxy, ethoxy, acetylamino, benzoylamino or nitro group or chlorine atoms, R₉ represents identical or different methyl, ethyl, cyclohexyl, methoxy, ethoxy, dodecyloxy, acetylamino, nitrio, carbomethoxy, carboethoxy, carboxylic acid amide, carboxylic acid methylanilide, carboxylic acid ethylanilide, sulphonic acid amide, methylsulphonyl, phenylsulphonyl, nitrile or trifluoromethyl groups and/or chlorine, bromine or fluorine atoms, n represents the numbers 0, 1, 2 or 3, u represents the numbers 0, 1, 2 or 3, and A⁻ represents an anion.

Particularly preferred methine dyestuffs according to the invention are those having the following general formula

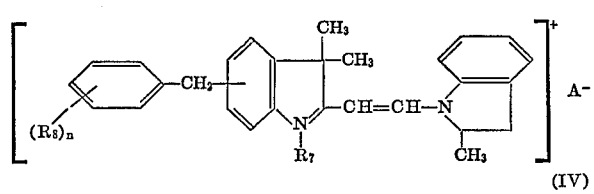

(IV)

wherein

R₇ represents methyl, ethyl or benzyl,

R₈ represents identical or different methyl, ethyl, hydroxyl, methoxy, ethoxy, acetylamino, benzoylamino or nitro groups or chlorine atoms, n represents the numbers 0, 1, 2 or 3 and A⁻ represents an anion.

Those of the methine dyestuffs according to the invention in which the anion A⁻ in the Formulae II–IV is the anion of a monobasic organic acid with 4–30 carbon atoms are of particular importance for deying from chlorinated hydrocarbons.

The methine dyestuffs according to the invention, of the formula

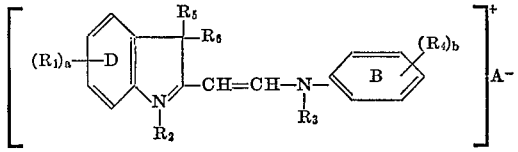

(III)

wherein

R₁ represents halogen, lower alkyl, cycloalkyl, alkoxy, nitro, carbalkoxy, nitrile, acyl, acylamino, carboxylic acid amide, carboxylic acid alkylanilide, sulphonic acid amide, alkylsulphonyl, arylsulphonyl, carboxylic acid alkylamide, sulphonic acid alkylamide, trifluoromethyl or aralkyl and R₄ represents halogen, lower alkyl, cycloalkyl, alkoxy, nitro, carbalkoxy, nitrile, acyl, acylamine, amino, carboxylic acid amide, carboxylic acid alkylanilide, sulphonic acid amide, alkylsulphonyl, arylsulphonyl, carboxylic acid alkylamide, sulphonic acid alkylamide, trifluoromethyl or aralkyl, with at least one of the substituents R₁ and R₄ representing aralkyl, R₂ represents hydrogen, lower alkyl, cycloalkyl, aralkyl, or aryl, R₃ represents hydrogen or lower alkyl, which can, where appropriate, close a 5-membered or 6-membered ring by joining to the adjacent position of the aryl ring B, it being possible for this heterocyclic 5-membered or 6-membered ring, thus formed, to be alkyl-substituted or condensed with a further carbocyclic ring, R₅ represents lower alkyl, aralkyl or cycloalkyl, R₆ represents lower alkyl, aralkyl or cycloalkyl, a represents the numbers 0, 1, 2 or 3, b represents the numbers 0, 1, 2 or 3 and A⁻ represents an anion, and wherein the aromatic carbocyclic rings of the dyestuff can contain further non-ionic substituents, can be manufactured if, in a manner which is in itself known, amines of the formula

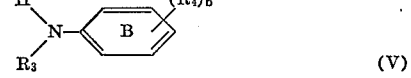

(V)

wherein the benzene ring B, b and the radicals R₃ and R₄ have the indicated meaning, are condensed with aldehydes of the formula

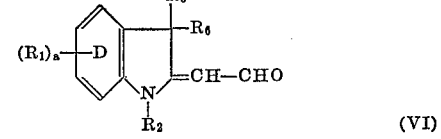

(VI)

wherein the benzene ring D, $a$ and the radicals $R_1$, $R_2$, $R_5$ and $R_6$ have the indicated meaning, or with their functional derivatives.

The condensation can be carried out by stirring the solution or suspension of equimolar amounts of the compounds V and VI in an organic or inorganic acid, or their mixture, with water at 10–120° C., preferably at 20–60° C.

Suitable acids are, for example, dilute aqueous mineral acids, such as sulphuric acid, phosphoric acid or hydrochloric acid. Lower fatty acids, such as formic acid, acetic acid, propionic acid, butyric acid, lactic acid and their mixtures with water are also suitable.

The condensation can also be carried out in a solvent such as, say, benzene, toluene, chlorobenzene, methanol and ethanol, in the presence of acid condensation agents, such as, say, phosphorus oxychloride, phosphorus pentoxide, zinc chloride, aluminium chloride, tin chloride, sulphuric acid, phosphoric acid, polyphosphoric acid or hydrochloric acid, or their mixtures.

As amines of the Formula V there may, for example, be mentioned:

4-aminodiphenylmethane,
4-aminodiphenylethane,
4-amino-4'-nitrodiphenylmethane,
4-amino-4'-hydroxydiphenylmethane,
4-amino-4'-hydroxydiphenylpropane-(2,2),
4-amino-4'-ethyldiphenylmethane,
4-amino-4'-methyldiphenylmethane,
3-aminodiphenylmethane,
3-amino-4'-methyldiphenylmethane,
3-amino-2',4'-dimethyldiphenylmethane,
3-amino-2',5'-dimethyldiphenylmethane,
3-amino-4-methyl-2',4'-dimethyldiphenylmethane,
3-amino-4-methyl-4'-methyldiphenylmethane,
2-aminodiphenylmethane,
3-amino-2',4',6'-trimethyldiphenylmethane,
3-amino-4'-methoxydiphenylmethane,
4-amino-4'-acetylamino-diphenylmethane,
4-amino-4'-benzoylamino-diphenylmethane,
4-amino-2',4',5'-trimethyldiphenylmethane,
4-amino-4'-chlorodiphenylmethane,
4-amino-4'-methoxy-diphenylmethane,
4-amino-4'-ethoxy-diphenylmethane,
4-amino-2',5'-dimethyldiphenylmethane,
aniline,
p-toluidine,
m-toluidine,
o-anisidine,
m-anisidine,
p-anisidine,
o-phenetidine,
p-phenetidine,
4-dodecyloxyaniline,
4-aminoacetanilide,
N-benzoyl-p-phenylenediamine,
2,4-dimethoxyaniline,
2,5-dimethoxyaniline,
3,4-dimethoxyaniline,
2-chloro-4-aminoanisole,
2,4,5-trimethylaniline,
2,3,5-trimethylaniline,
5-amino-2-acetylaminoanisole,
6-amino-3-methoxy-toluene,
3,4-dicyanoaniline,
p-sulphanilic acid amide,
4-aminobenzamide,
4-chloroaniline,
4-fluoroaniline,
1,2,3,4-tetrahydro-5-aminonaphthalene,
4-amino-2,5-diethoxybenzanilide,
4-amino-2-methyl-5-methoxybenzanilide,
1,2,3,4-tetrahydro-6-methoxyquinoline,
4-cyclohexylaniline,
2,5-diethoxyaniline,
1,2,3,4-tetrahydroquinoline,
2-aminonaphthalene,
2-methyldihydroindole,
hexahydrocarbazole,
4-methylaminodiphenylmethane, and
4-ethylaminodiphenylmethane.

As aldehydes of the Formula VI it is for example possible to use:

1,3,3-trimethyl-2-methylene-2,3-dihydroindol-ω-aldehyde,
1,3,3,5-tetramethyl-2-methylene-2,3-dihydroindol-ω-aldehyde,
1,3,3-trimethyl-5-chloro-2-methylene-2,3-dihydroindol-ω-aldehyde,
1,3,3-trimethyl-5-methoxy-2-methylene-2,3-dihydroindol-ω-aldehyde,
1,3,3-trimethyl-5-carbomethoxy-2-methylene-2,3-dihydroindol-ω-aldehyde,
1,3,3-trimethyl-5-carbethoxy-2-methylene-2,3-dihydroindol-ω-aldehyde,
1,3,3-trimethyl-5-cyclohexyl-2-methylene-2,3-dihydroindol-ω-aldehyde,
1,3,3-trimethyl-5-benzyl-2-methylene-2,3-dihydroindol-ω-aldehyde,
1,3,3-trimethyl-5-nitro-2-methylene-2,3-dihydroindol-ω-aldehyde,
1,3,3-trimethyl-7-methyl-2-methylene-2,3-dihydroindol-ω-aldehyde,
1,3,3-trimethyl-5-trifluoromethyl-2-methylene-2,3-dihydroindol-ω-aldehyde,
1,3,3-trimethyl-7-methoxy-2-methylene-2,3-dihydroindol-ω-aldehyde,
1,3,3-trimethyl-7-chloro-2-methylene-2,3-dihydroindol-ω-aldehyde,
1-ethyl-3,3-dimethyl-2-methylene-2,3-dihydroindol-ω-aldehyde,
1-ethyl-3,3,5-trimethyl-2-methylene-2,3-dihydroindol-ω-aldehyde,
1-ethyl-3,3-dimethyl-5-chloro-2-methylene-2,3-dihydroindol-ω-aldehyde,
1-ethyl-3,3-dimethyl-5-methoxy-2-methylene-2,3-dihydroindol-ω-aldehyde,
1-ethyl-3,3-dimethyl-5-carbomethoxy-2-methylene-2,3-dihydroindol-ω-aldehyde,
1-ethyl-3,3-dimethyl-5-carbethoxy-2-methylene-2,3-dihydroindol-ω-aldehyde,
1-ethyl-3,3,7-trimethyl-5-cyclohexyl-2-methylene-2,3-dihydroindol-ω-aldehyde,
1-ethyl-3,3-dimethyl-5-benzyl-2-methylene-2,3-dihydroindol-ω-aldehyde,
1-ethyl-3,3-dimethyl-5-nitro-2-methylene-2,3-dihydroindol-ω-aldehyde,
1-benzyl-3,3-dimethyl-2-methylene-2,3-dihydroindol-ω-aldehyde,
1-phenyl-3,3-dimethyl-2-methylene-2,3-dihydroindol-ω-aldehyde,
1,3,3-trimethyl-4-benzyl-2-methylene-2,3-dihydroindol-ω-aldehyde,
1,3,3-trimethyl-6-benzyl-2-methylene-2,3-dihydroindol-ω-aldehyde,
1,3,3-trimethyl-7-benzyl-2-methylene-2,3-dihydroindol-ω-aldehyde,
1,3,3-trimethyl-(6,7)-benzo-2-methylene-2,3,3',4',5',6'-hexyhydroindol-ω-aldehyde,
1,3,3-trimethyl-5-fluoro-2-methylene-2,3-dihydroindol-ω-aldehyde,
1,3,3-trimethyl-5-ethoxy-2-methylene-2,3-dihydroindol-ω-aldehyde,
1,3,3-trimethyl-7-ethoxy-2-methylene-2,3-dihydroindol-ω-aldehyde,
1,3,3-trimethyl-5-cyano-2-methylene-2,3-dihydroindol-ω-aldehyde,
1,3,3-trimethyl-5-acetylamino-2-methylene-2,3-dihydroindol-ω-aldehyde, 1,3,3-trimethyl-5-methylsulphonyl-2-methylene-2,3-dihydroindol-ω-aldehyde,
1,3,3-trimethyl-5-phenylsulphonyl-2-methylene-2,3-dihydroindol-ω-aldehyde,
1,3-dimethyl-3-ethyl-2-methylene-2,3-dihydroindol-ω-aldehyde,
1,3,3-trimethyl-benzo-(6,7)-2-methylene-2,3-dihydroindol-ω-aldehyde,
1,3,3-trimethyl-5-sulphonamido-2-methylene-2,3-dihydroindol-ω-aldehyde,
1,3,3-trimethyl-5-carbonamido-2-methylene-2,3-dihydroindol-ω-aldhyde,
1,3,3-trimethyl-5-carboxylic acid ethylanilide-2-methylene-2,3-dihydroindol-ω-aldehyde,
1,3,3-trimethyl-7-ethyl-2-methylene-2,3-dihydroindol-ω-aldehyde,
1,3,3-trimethyl-5-chloro-7-methoxy-2-methylene-2,3-dihydroindol-ω-aldehyde,
1,3,3-trimethyl-4-chloro-7-methoxy-2-methylene-2,3-dihydroindol-ω-aldehyde,
1,3,3-trimethyl-4,6-dicarbomethoxy-2-methylene-2,3-dihydroindol-ω-aldehyde,
1,3,3-trimethyl-4,5-dichloro-7-methoxy-2-methylene-2,3-dihydroindol-ω-aldehyde,
1,3,3-trimethyl-5-chloro-4,7-dimethoxy-2-methylene-2,3-dihydroindol-ω-aldehyde,
1,3,3,4,5,7-hexamethyl-2-methylene-2,3-dihydroindol-ω-aldehyde and
1,3,3,4,6,7-hexamethyl-2-methylene-2,3-dihydroindol-ω-aldehyde.

A further method for the manufacture of the dyestuffs of the Formula I is based on the condensation of N-formyl compounds of the formula

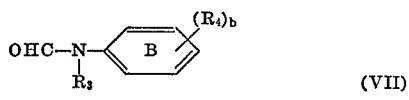

(VII)

wherein the benzene ring B, $b$ and the radicals $R_3$ and $R_4$ have the abovementioned meaning, with dihydroindoles of the formula

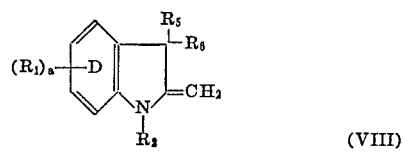

(VIII)

wherein the benzene ring D, $a$ and the radicals $R_1$, $R_2$, $R_5$ and $R_6$ have the abovementioned meaning.

According to this method, the reaction is for example carried out by warming an amine of the abovementioned Formula V with formic acid in an inert solvent, say chlorobenzene, until the water formed has been separated off azeotropically. This process is carried out at the distillation temperature of the inert solvent, for example at 100–140° C. The resulting solution of the compound of the Formula VII is treated with the equimolar amount of the methylene base VIII. An acid condensation agent is then added at room temperature, and the condensation is carried out at temperatures of 20–70° C. Suitable condensation agents are, for example, phosphorus oxychloride, phosphorus pentoxide, polyphosphoric acid, sulphuric acid and their mixtures.

Suitable amines for this reaction are, for example:

4-aminodiphenylmethane,
4-aminodiphenylethane,
4-amino-4'-nitrodiphenylmethane,
4-amino-4'-hydroxydiphenylmethane,
4-amino-4'-hydroxydiphenylpropane-(2,2),
4-amino-4'-ethyldiphenylmethane,
4-amino-4'-methyldiphenylmethane,
3-aminodiphenylmethane,
3-amino-4'-methyldiphenylmethane,
3-amino-2',4'-dimethyldiphenylmethane,
3-amino-2',5'-dimethyldiphenylmethane,
3-amino-4-methyl-2',4'-dimethyldiphenylmethane,
3-amino-4-methyl-4'-methyldiphenylmethane,
2-aminodiphenylmethane,
3-amino-2',4',6'-trimethyldiphenylmethane,
3-amino-4'-methoxydiphenylmethane,
4-amino-4'-acetylamino-diphenylmethane,
4-amino-4'-benzoylamino-diphenylmethane,
4-amino-2',4',5'-trimethyldiphenylmethane,
4-amino-4'-chlorodiphenylmethane,
4-amino-4'-methoxy-diphenylmethane,
4-amino-4'-ethoxy-diphenylmethane,
4-amino-2',5'-dimethyldiphenylmethane,
aniline,
p-toluidine,
m-anisidine,
m-toluidine,
o-phenetidine,
p-anisidine,
o-anisidine,
p-phenetidine,
4-dodecyloxyaniline,
4-aminoacetanilide,
N-benzoyl-p-phenylenediamine,
2,4-dimethoxyaniline,
2,5-dimethoxyaniline,
3,4-dimethoxyaniline,
2-chloro-4-aminoanisole,
2,4,5-trimethylaniline,
2,3,5-trimethylaniline,
5-amino-2-acetylaminoanisole,
6-amino-3-methoxy-toluene,
3,4-dicyanoaniline,
p-sulphanilic acid amide,
4-aminobenzamide,
4-chloroaniline,
4-fluoroaniline,
1,2,3,4-tetrahydro-5-amino-naphthalene,
4-amino-2,5-diethoxybenzanilide,
4-amino-2-methyl-5-methoxybenzanilide,
1,2,3,4-tetrahydro-6-methoxyquinoline,
4-cyclohexylaniline,
2,5-diethoxyaniline,
1,2,3,4-tetrahydroquinoline,
2-aminonaphthalene,
2-methyldihydroindole,
hexahydrocarbazole,
4-methylaminodiphenylmethane and
4-ethylamino-diphenylmethane.

2,3-dihydro-2-methyleneindoles of the Formula VIII which are suitable according to the invention are, for example:

1,3,3-trimethyl-2-methylene-2,3-dihydroindole,
1,3,3,5-tetramethyl-2-methylene-2,3-dihydroindole,
1,3,3-trimethyl-5-chloro-2-methylene-2,3-dihydroindole,
1,3,3-trimethyl-5-methoxy-2-methylene-2,3-dihydroindole,
1,3,3-trimethyl-5-carbomethoxy-2-methylene-2,3-dihydroindole,
1,3,3-trimethyl5-carbomethoxy-2-methylene-2,3-dihydroindole,
1,3,3-trimethyl-5-carbethoxy-2-methylene-2,3-dihydroindole,
1,3,3-trimethyl-5-cyclohexyl-2-methylene-2,3-dihydroindole,
1,3,3-trimethyl-5-benzyl-2-methylene-2,3-dihydroindole,
1,3,3-trimethyl-5-nitro-2-methylene-2,3-dihydroindole,
1,3,3-trimethyl-7-methyl-2-methylene-2,-dihydroindole, 1,3,3-trimethyl-5-trifluoromethyl-2-methylene-
2,3-dihydroindole,
1,3,3-trimethyl-7-methoxy-2-methylene-
2,3-dihydroindole,
1,3,3-trimethyl-7-chloro-2-methylene-2,3-dihydroindole,
1-ethyl-3,3-dimethyl-2-methylene-2,3-dihydroindole,
1-ethyl-3,3,5-trimethyl-2-methylene-2,3-dihydroindole,
1-ethyl-3,3-dimethyl-5-chloro-2-methylene-
2,3-dihydroindole,
1-ethyl-3,3-dimethyl-5-methoxy-2-methylene-
2,3-dihydroindole,
1-ethyl-3,3-dimethyl-5-carbomethoxy-2-methylene-
2,3-dihydroindole,
1-ethyl-dimethyl-5-carbomethoxy-2-methylene-
2,3-dihydroindole,
1-ethyl-3,3-dimethyl-5-carbethoxy-2-methylene-
2,3-dihydroindole,
1-ethyl-3,3,7-trimethyl-5-cyclohexyl-2-methylene-
2,3-dihydroindole,
1-ethyl-3,3-dimethyl-5-benzyl-2-methylene-
2,3-dihydroindole,
1-ethyl-3,3-dimethyl-5-nitro-2-methylene-
2,3-dihydroindole,
1-benzyl-3,3-dimethyl-2-methylene-2,3-dihydroindole,
1-phenyl-3,3-dimethyl-2-methylene-2,3-dihydroindole,
1,3,3-trimethyl-4-benzyl-2-methylene-2,3-dihydroindole,
1,3,3-trimethyl-6-benzyl-2-methylene,2,3-dihydroindole,
1,3,3-trimethyl-7-benzyl-2-methylene-2,3-dihydroindole,
1,3,3-trimethyl-(6,7)-benzo-2-methylene-2,3,3′,4′,5′,6′-
hexyhydroindole,
1,3,3-trimethyl-5-fluoro-2-methylene-23-dihydroindole,
1,3,3-trimethyl-5-ethoxy-2-methylene-2,3-dihydroindole,
1,3,3-trimethyl-7-ethoxy-2-methylene-2,3-dihydroindole,
1,3,3-trimethyl-5-cyano-2-methylene-2,3-dihydroindole,
1,3,3-trimethyl-5-acetylamino-2-methylene-
2,3-dihydroindole,
1,3,3-trimethyl-5-methylsulphonyl-2-methylene-
2,3-dihydroindole,
1,3,3-trimethyl5-phenylsulphonyl-2-methylene-
2,3-dihydroindole,
1,3-dimethyl-3-ethyl-2-methylene-2,3-dihydroindole,
1,3,3-trimethyl-benzo-(6,7)-2-methylene-
2,3-hydroindole,
1,3,3-trimethyl-5-sulphonamide-2-methylene-
2,3-dihydroindole,
1,3,3-trimethyl-5-carbonamido-2-methylene-
2,3-dihydroindole,
1,3,3-trimethyl-5-carboxylic acid ethylaniline-2-
methylene-2,3-dihydroindole,
1,3,3-trimethyl-7-ethyl-2-methylene-2,3-dihydroindole,
1,3,3-trimethyl-5-chloro-7-methoxy-2-methylene-
2,3-dihydroindole,
1,3,3-trimethyl-4-chloro-7-methoxy-2-methylene-
2,3-dihydroindole,
1,3,3-trimethyl-4,6-dicarbomethoxy-2-methylene-
2,3-dihydroindole,
1,3,3-trimethyl-4,5-dichloro-7-methoxy-2-methylene-
2,3-dihydroindole,
1,3,3-trimethyl-5-chloro-4,7-dimethoxy-2-methylene-
2,3-dihydroindole,
1,3,3,4,5,7-hexamethyl-2-methylene-2,3-dihydroindole,
and
1,3,3,4,6,7-hexamethyl-2-methylene-2,3-dihydroindole.

Both methods can also be used to manufacture dyestuffs of the Formulae II, III and IV.

The new products are valuable dyestuffs which can be used for dyeing and printing materials of leather, mordanted cotton, cellulose, synthetic polyamides and polyurethanes, and for dyeing fibres containing lignin, such as coir, jute and sisal. They are furthermore suitable for the manufacture of writing fluids, rubber-stamp inks and ball-pen pastes, and can also be used in flexographic printing.

Suitable materials for dyeing with the basic dyestuffs of the above general formula are especially, flocks, fibres, filaments, strips, woven fabrics or knitted fabrics of polyacrylonitrile, or of copolymers of acrylonitrile with other vinyl compounds such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene, or flocks, fibres, filaments, strips, woven fabrics or knitted fabrics of acid-modified aromatic polyesters, as well as acid-modified polyamide fibres. Acid-modified aromatic polyesters are, for example, polycondensation products of sulphoterephthalic acid and ethylene glycol, that is to say polyethylene glycol terephthalates containing sulphonic acid groups (type Dacron 64 of E. I. du Pont de Nemours and Company), such as are described in Belgian patent specification No. 549,179 and U.S.A. patent specification 2,893,816.

Dyeing can be carried out in a weakly acid liquor, in which case the goods are appropriately introduced into the dyebath at 40–60° C. and then dyed at the boil. It is also possible to dye under pressure at temperatures above 100° C. Moreover, the dyestuffs can be added to spinning solutions for the manufacture of fibres containing polyacrylonitrile, or be applied to the unstretched fibre.

The dyeing on polyacrylonitrile, acid-modified polyesters and acid-modified polyamide are distinguished by very good fastness to light, wet processing, rubbing and sublimation and by a high affinity for the fibre. With anionic precipitants, such as alumina, tannin, phosphotungstic and phosphomolybdic acids, the dyestuffs form lightfast pigments which can advantageously be employed in paper printing.

The dyestuffs can be employed individually or in mixtures.

Dyestuffs according to the invention which have substituents which assist the solubility in chlorinated hydrocarbons, such as the tertiary butyl group, or long-chain alkoxy groups, such as the dodecyloxy group, or which have anions (A⁻ in the Formulae I to IV of monobasic organic acids with 4–30 carbon atoms, are well suited to dyeing shaped articles made from polymers or copolymers of acrylonitrile, asymmetrical dicyanoethylene, acid-modifier aromatic polyesters or acid-modified synthetic polyamides in chlorinated hydrocarbons.

Such organic acids are, for example: 2-ethylcaproic acid, lauric acid, oleic acid, linoleic acid, a mixture of aliphatic carboxylic acids wth 15–19 carbon atoms (Versatic Acid 1519 of Messrs. Shell), a mixture of aliphatic carboxylic acids with 9–11 carbon atoms (Versatic Acid 911 of Messrs. Shell), coconut fatty acid first runnings, tetradecanoic acid, undecylenoic acid, dimethylpropanoic acid, dimethylacetic acid, carboxylic acids of which the carbon chain is interrupted by hetero-atoms, such as nonylphenol-tetraethylene glycol-ether-propionic acid, nonylphenol - diethylane glycol - ether - propionic acid, dodecyl-tetraethylene glycol-ether-propionic acid, 3-(nonyloxy)-propionic acid, 3-(isotridecyloxy)-propionic acid, 3-(isotridecyloxy)-diethylene glycol-ether-propionic acid, ether-propionic acid from an alcohol mixture with 6–10 carbon atoms, nonylphenoxyacetic acid, aromatic carboxylic acids such as tert.-butyl-benzoic acid, cycloaliphatic carboxylic acid, such as hexahydrobenzoic acid, cyclohexenecarboxylic acid and abietic acid, and sulphonic acids, such as tetrapropylenebenzenesulphonic acid.

If the dyestuffs according to the invention are present as salts of the monobasic organic acids with 4–30 carbon atoms which have been mentioned, concentrated solutions, of good stability, of these dyestuffs in chlorinated hydrocarbons can be manufacture, and for these it is at times useful to add polar organic solvents whcih are completely miscible with chlorinated hydrocarbons, such as butyrolactone, dimethylformamide, methanol, dioxane, acetonitrile, methyl ethyl ketone, nitrobenzene, dimethylsulphoxide, benzonitrile and/or 2-nitrochlorobenzene.

To manufacture such solutions, the methine dyestuffs (in the form of their free bases or as salts of organic acids with 4-30 carbon atoms) are mixed, preferably by stirring, with chlorinated hydrocarbons and monobasic organic acids with 4-30 carbon atoms, with the addition of the abovementioned polar organic solvents which are completely miscible with chlorinated hydrocarbons, the process being carried out at elevated temperature if appropriate.

In the examples, the relationship of parts by weight to parts by volume is as of the gram to the ml.

EXAMPLE 1

23.6 parts by weight of 1,3,3-trimethyl-5-chloro-2,3-dihydroindolaldehyde and 18.3 parts by weight of 4-aminodiphenylmethane are stirred for 4 hours at room temperature with 60 parts by volume of glacial acetic acid and 15 parts by volume of water, and are then diluted with 1000 parts by volume of water. The resulting dyestuff is salted out with 50 parts by weight of sodium chloride, separated from the solution, redissolved in 1500 parts by volume of water containing 50 parts by volume of glacial acetic acid, again salted out with sodium chloride, separated off and dried. The resulting dyestuff has the formula

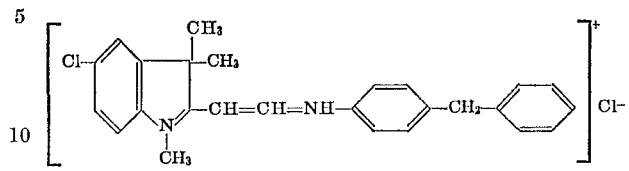

It dyes materials of polyacrylonitrile, acid-modified polyesters and acid-modified polyamide in greenish-tinged yellow shades having very good fastness to light and to wet processing.

Similar valuable dyestuffs are obtained in an analogous manner on using the following aldehydes and amines. The colour shades indicated relate to the dyeing of polycarylonitrile.

TABLE

| Aldehyde | Amine | Colour shade |
|---|---|---|
| 1,3,3-trimethyl-2-methylene-2,3-dihydroindol-ω-aldehyde | 4-aminodiphenylmethane | Yellow. |
| 1,3,3,5-tetramethyl-2-methylene-2,3-dihydroindol-ω-aldehyde | do | Do. |
| 1,3,3-trimethyl-5-methoxy-2-methylene-2,3-dihydroindol-ω-aldehyde | do | Do. |
| 1,3,3-trimethyl-5-carbomethoxy-2-methylene-2,4-dihydroindol-ω-aldehyde | do | Greenish-tinged yellow. |
| 1,3,3,-trimethyl-5-carboethoxy-2-methylene-2,3-dihydroindol-ω-aldehyde | do | Do. |
| 1,3,3,-trimethyl-5-cyclohexyl-2-methylene-2,3-dihydroindol-ω-aldehyde | do | Yellow. |
| 1,3,3-trimethyl-5-benzyl-2-methylene-2,3-dihydroindol-ω-aldehyde | do | Do. |
| 1,3,3-trimethyl-5-nitro-2-methylene-2,3-dihydroindol-ω-aldehyde | do | Reddish-tinged yellow. |
| 1,3,3-trimethyl-7-methyl-2-methylene-2,3-dihydroindol-ω-aldehyde | do | Yellow. |
| 1,3,3-trimethyl-5-trifluoromethyl-2-methylene-2,3-dihydroindol-ω-aldehyde | do | Do. |
| 1,3-3-trimethyl-7-methoxy-2-methylene-2,3-dihydroindol-ω-aldehyde | do | Do. |
| 1,3,3-trimethyl-7-chloro-2-methylene-2,3-dihydroindol-ω-aldehyde | do | Do. |
| 1-ethyl-3,3-dimethyl-2-methylene-2,3-dihydroindol-ω-aldehyde | do | Do. |
| 1-ethyl-3,3,5-trimethyl-2-methylene-2,3-dihydroindol-ω-aldehyde | do | Do. |
| 1-ethyl-3,3-dimethyl-5-chloro-2-methylene-2,3-dihydroindol-ω-aldehyde | do | Greenish-tinged yellow. |
| 1-ethyl-3,3-dimethyl-5-methoxy-2-methylene-2,3-dihydroindol-ω-aldehyde | do | Yellow. |
| 1-ethyl-3,4-dimethyl-5-carboethoxy-2-methylene-2,3-dihydroindol-ω-aldehyde | do | Do. |
| 1-ethyl-3,3-dimethyl-5-cyclohexyl-2-methylene-2,3-dihydroindol-ω aldehyde. | do | Do. |
| 1-ethyl-3,3-dimethyl-5-benzyl-2-methylene-2,3-dihydroindol-ω-aldehyde | do | Do. |
| 1-ethyl-3,3-dimethyl-5-nitro-2-methylene-2,3-dihydroindol-ω-aldehyde | do | Do. |
| Mixture of 1,3,3-trimethyl-4-methyl-2-methylene-2,3-dihydroindol-ω-aldehyde and 1,3,3-trimethyl-6-methyl-2-methylene-2,3-dihydroindol-ω aldehyde. | do | Do. |
| 1,3,3-trimethyl-(6,7)-benzo-2-methylene-2,3,3',4',5',6',-hexahydroindol-ω-aldehyde. | do | Reddish-tinged yellow. |
| 1,3,3-trimethyl-5-fluoro-2-methylene-2,3-dihydroindol-ω-aldehyde | do | Yellow. |
| 1,3,3-trimethyl-5-ethoxy-2-methylene-2,3-dihydroindol-ω-aldehyde | do | Do. |
| 1,3,3-trimethyl-7-ethoxy-2-methylene-2,3-dihydroindol-ω-aldehyde | do | Do. |
| 1,3,3-trimethyl-5-cyano-2-methylene-2,3-dihydroindol-ω-aldehyde | do | Greenish-tinged yellow. |
| 1,3,3-trimethyl-5-acetylamino-2-methylene-2,3-dihydroindol-ω-aldehyde | do | Yellow. |
| 1,3,3-trimethyl-5-methylsulphonyl-2-methylene-2,3-dihydroindol-ω-aldehyde | do | Do. |
| 1,3,3-trimethyl-5-phenylsulphonyl-2-methylene-2,3-dihydroindol-ω-aldehyde | do | Do. |
| 1,3-dimethyl-3-ethyl-2-methylene-2,3-dihydroindol-ω-aldehyde | do | Do. |
| 1,3,3-trimethyl-6,7-benzo-2-methylene-2,3-dihydroindol-ω-aldehyde | do | Do. |
| 1,3,3-trimethyl-5-sulphonamido-2-methylene-2,3-dihydroindol-ω-aldehyde | do | Do. |
| 1,3,3-trimethyl-5-carbonamido-2-methylene-2,3-dihydroindol-ω-aldehyde. | do | Do. |
| 1,3,3-trimethyl-5-carboxylic acid ethylanilide-2-methylene-2,3-dihydroindol-ω-aldehyde. | do | Do. |
| 1,3,3-trimethyl-7-ethyl-2-methylene-2,3-dihydroindol-ω-aldehyde | do | Do. |
| 1,3,3-trimethyl-5-chloro-7-methoxy-2-methylene-2,3-dihydroindol-ω-aldehyde | do | Do. |
| 1,3,3-trimethyl-4-chloro-7-methoxy-2-methylene-2,3-dihydroindol-ω-aldehyde | do | Do. |
| 1,3,3-trimethyl-4,6-dicarbomethoxy-2-methylene-2,3-dihydroindol-ω-aldehyde. | do | Do. |
| 1,3,3-trimethyl-4,5-dichloro-7-methoxy-2-methylene-2,3-dihydroindol-ω-aldehyde | do | Do. |
| 1,3,3-trimethyl-5-chloro-4,7-dimethoxy-2-methylene-2,3-dihydroindol-ω-aldehyde. | do | Do. |
| 1,3,3,4,5,7-hexamethyl-2-methylene-2,3-dihydroindol-ω-aldehyde | do | Do. |
| 1,3,3,4,6,7-hexamethyl-2-methylene-2,3-dihydroindol-ω-aldehyde | do | Do. |
| 1,3,3-trimethyl-5-chloro-2-methylene-2,3-dihydroindol-ω-aldehyde | 4-aminodiphenylethane | Do. |
| Do | 4-amino-4'-nitrodiphenylmethane | Do. |
| Do | 4-amino-4'-hydroxydiphenylmethane | Do. |
| Do | 4-amino-4'-hydroxyphenylpropane(2,2) | Do. |
| Do | 4-amino-4'-ethyldiphenylmethane | Greenish-tinged yellow. |
| Do | 4-amino-4'-methyldiphenylmethane | Do. |
| Do | 3-aminodiphenylmethane | Yellow. |
| Do | 3-amino-4'-methyldiphenylmethane | Do. |
| Do | 3-amino-2',4'-dimethyldiphenylmethane | Do. |
| Do | 3-amino-2',5'-dimethyldiphenylmethane | Do. |
| Do | 3-amino-4-methyl-2',4'-dimethyldiphenylmethane | Do. |
| Do | 3-amino-4-methyl-4'-methyl-diphenylmethane | Do. |
| Do | 2-aminodiphenylmethane | Do. |
| Do | 3-amino-2',4',6'-trimethyldiphenylmethane | Do. |
| Do | 3-amino-4'-methoxy-diphenylmethane | Do. |
| Do | 4-amino-4'-acetylamino-diphenylmethane | Do. |
| Do | 4-amino-2',4',5'-trimethyldiphenylmethane | Do. |
| 1,3,3-trimethyl-5-chloro-2-methylene-2,3-dihydroindol-ω-aldehyde | 4-amino-4'-chloro-diphenylmethane | Do. |
| Do | 4-amino-4'-methoxy-diphenylmethane | Do. |
| 1,3,3-trimethyl-5-carbomethoxy-2-methylene-2,3-dihydroindol-ω-aldehyde | 4-amino-4'-methoxy-diphenylmethane | Do. |
| Do | 4-amino-4'-ethoxy-diphenylmethane | Do. |

TABLE—Continued

| Aldehyde | Amine | Colour shade |
|---|---|---|
| 1,3,3-trimethyl-5-chloro-2-methylene-2,3-dihydroindol-ω-aldehyde | 4-amino-4'-ethoxy-diphenylmethane | Do. |
| Do | 4-amino-2',5'-dimethyl-diphenylmethane | Do. |
| 1,3,3-trimethyl-5-benzyl-2-methylene-2,3-dihydroindol-ω-aldehyde | Aniline | Greenish-tinged yellow. |
| Do | p-Toluidine | Do. |
| Do | m-Toluidine | Do. |
| Do | o-Anisidine | Yellow. |
| Do | m-Anisidine | Greenish-tinged yellow. |
| Do | p-Anisidine | Do. |
| Do | o-Phenetidine | Yellow. |
| Do | p-Phenetidine | Greenish-tinged yellow. |
| Do | 4-dodecyloxyaniline | Yellow. |
| Do | 4-aminoacetanilide | Greenish-tinged yellow. |
| Do | N-benzoyl-p-phenylenediamine | Do. |
| Do | 2,4-dimethoxyaniline | Reddish-tinged yellow. |
| Do | 2,5-dimethoxyaniline | Do. |
| Do | 3,4-dimethoxyaniline | Do. |
| Do | 3,4-diisopropoxyaniline | Do. |
| Do | 2-chloro-4-aminoanisole | Yellow. |
| Do | 2,4,5-trimethylaniline | Greenish-tinged yellow. |
| Do | 2,3,5-trimethylaniline | Do. |
| Do | 5-amino-2-acetylamino-anisole | Reddish-tinged yellow. |
| Do | 6-amino-3-methoxy-toluene | Yellow. |
| Do | 3,4-dicyanoaniline | Do. |
| Do | p-Sulphanilic acid amide | Do. |
| Do | 4-amino-benzamide | Do. |
| Do | 4-chloroaniline | Greenish-tinged yellow. |
| Do | 4-fluoroaniline | Do. |
| Do | 1,2,3,4-tetrahydro-5-aminonaphthalene | Yellow. |
| Do | 4-amino-2,5-diethoxy-N-benzoylaniline | Yellowish-tinged orange. |
| Do | 4-amino-2-methyl-5-methoxy-N-benzoyl-aniline | Yellow. |
| Do | 4-cyclohexylaniline | Greenish-tinged yellow. |
| Do | 2,5-diethoxyaniline | Yellow. |
| Do | 2-amino-naphthalene | Do. |
| Do | 2-methyl-2,3-dihydroindole | Greenish-tinged yellow. |
| Do | 1,2,3,4-tetrahydroquinoline | Do. |
| Do | Hexahydrocarbazole | Yellow. |
| Do | 1,2,3,4-tetrahydro-6-methoxyquinoline | Do. |
| 1,3,3-trimethyl-5-chloro-2-methylene-2,3-dihydroindol-ω-aldehyde | 4-methylamino-diphenylmethane | Do. |
| Do | 4-ethylamino-diphenyl-methane | Greenish-tinged yellow. |
| 1,3,3-trimethyl-5-(p-methoxy)-benzyl-2-methylene-2,3-dihydroindol-ω-aldehyde. | p-Anisidine | Do. |
| Do | 2-methyl-2,3-dihydroindole | Do. |
| 1,3,3-trimethyl-5-(p-methyl)-benzyl-2-methylene-2,3-dihydroindol-ω-aldehyde. | p-Anisidine | Do. |
| Do | 2-methyl-2,3-dihydroindole | Do. |
| 1,3,3-trimethyl-5-(p-chloro)-benzyl-2-methylene-2,3-dihydroindol-ω-aldehyde. | p-Anisidine | Do. |
| Do | 2-methyl-2,3-dihydroindole | Do. |
| Mixture of 1,3,3-trimethyl-4-benzyl-2-methylene-2,3-dihydroindol-ω-aldehyde and 1,3,3-trimethyl-6-benzyl-2-methylene-2,3-dihydroindol-ω-aldehyde. | p-Anisidine | Do. |
| Do | 2-methyl-2,3-dihydroindole | Do. |
| 1,3,3-trimethyl-7-benzyl-2-methylene-2,3-dihydroindol-ω-aldehyde | p-Anisidine | Do. |
| Do | 2-methyl-2,3-dihydroindole | Do. |
| 1,3,3-trimethyl-7-(p-methoxy)-benzyl-2-methylene-2,3-dihydroindol-ω-aldehyde- | p-Anisidine | Do. |
| Do | 2-methyl-2,3-dihydroindole | Do. |
| 1,3,3-trimethyl-7-(p-methyl)-benzyl-2-methylene-2,3-dihydroindol-ω-aldehyde. | p-Anisidine | Do. |
| Do | 2-methyl-2,3-dihydroindole | Do. |
| 1,3,3-trimethyl-5-carbomethoxy-2-methylene-2,3-dihydroindol-ω-aldehyde | 4-amino-4'-methyldiphenylmethane | Do. |
| 1,3,3-trimethyl-5-benzyl-2-methylene-2,3-dihydroindol-ω-aldehyde | N-methyl-p-anisidine | Yellow. |
| 1-benzyl-3,3-dimethyl-2-methylene-2,3-dihydroindol-ω-aldehyde | 4-aminodiphenylmethane | Do. |
| 1,3,3-trimethyl-2-methylene-5-benzyl-2,3-dihydroindol-ω-aldehyde | 1,2,3,4-tetrahydroquinoxaline | Reddish-tinged yellow. |

EXAMPLE 2

A mixture of 13.3 parts by weight of 2-methyl-2,3-dihydroindole, 10 parts by volume of formic acid and 120 parts by volume of chlorobenzene is slowly warmed, whilst stirring, ultimately to 140° C., and at the same time approx. 65 parts by volume of liquid are distilled off; the distillation residue is then cooled to 30° C. 16 parts by weight of phosphorus oxychloride are then stirred in and subsequently 26.4 parts by weight of 1,3,3-trimethyl-5-benzyl-2-methylene-2,3-dihydroindole are added dropwise whilst stirring. The mixture is stirred for 15 minutes without heating and then for 3 hours at 60° C. The dyestuff is separated from the solvent, redissolved in 1000 parts by volume of water and precipitated with sodium chloride. It dyes materials of polyacrylonitrile, acid-modified polyesters and acid-modified polyamide in clear greenish-tinged yellow shades of excellent fastness to light and to wet processing. It is identical with the dyestuff from 1,3,3-trimethyl-5-benzyl-2-methylene-2,3-dihydroindol-ω-aldehyde and 2-methyl-2,3-dihydroindole mentioned in the table accompanying Example 1, and has the formula

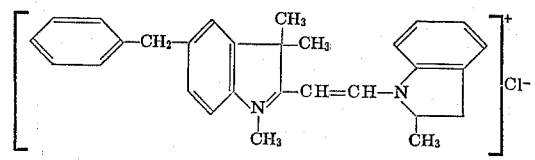

A valuable yellow dyestuff is also obtained if instead of 1,3,3-trimethyl-5-benzyl-2-methylenedihydroindole the equivalent quantity of 2,3,3-trimethyl-5-benzylindolenine is employed.

EXAMPLE 3

A woven fabric of polyacrylonitrile is printed with a printing paste which was prepared in the following manner:

330 parts by weight of hot water are poured over 30 parts by weight of the dyestuff described in Example 2, 50 parts by weight of thiodiethylene glycol, 30 parts by weight of cyclohexanol and 30 parts by weight of 30% strength acetic acid, and the resulting solution is added to 500 parts by weight of crystal gum (gum arabic as a thickener). Finally, 30 parts by weight of zinc nitrate solution are also added. The print obtained is dried, steamed for 30 minutes and subsequently rinsed. A yellow print of very good fastness properties is obtained.

EXAMPLE 4

Acid-modified polyglycol terephthalate fibres are introduced at 20° C., using a liquor ratio of 1:40, into an aqueous bath which per litre contains 3–10 g. of sodium sulphate, 0.1–1 g. of oleyl-glycol-ether (50 mols of ethylene oxide), 0–15 g. of dimethyl-benzyl-dodecylammonium chloride and 0.15 g. of the dyestuff described in Example 2, and which has been adjusted to pH 4–5 with acetic acid. The bath is heated to 100° C. over the course of 30 minutes and kept at this temperature for 60 minutes. Thereafter, the fibres are rinsed and dried. A yellow dyeing having very good fastness properties is obtained.

EXAMPLE 5

Polyacrylonitrile fibres are introduced at 40° C., using a liquor ratio of 1:40, into an aqueous bath which per litre contains 0.75 g. of 30% strength acetic acid, 0.38 g. of sodium acetate and 0.15 g. of the dyestuff described in Example 2. The bath is heated to the boil over the course of 20–30 minutes and kept at this temperature for 30–60 minutes. After rinsing and drying, a yellow dyeing having very good fastness properties is obtained.

EXAMPLE 6

A stock solution is prepared from 15 parts by weight of the dyestuff mentioned in Example 2, 15 parts by weight of polyacrylonitrile and 70 parts by weight of dimethylformamide, and is added to a customary polyacrylonitrile spinning solution, which is spun in a known manner. A greenish-tinged yellow dyeing having very good fastness properties is obtained.

EXAMPLE 7

Acid-modified polyamide fibres are introduced at 40° C., using a liquor ratio of 1:40, into an aqueous bath which per litre contains 10 g. of sodium acetate, 1–5 g. of oleyl-polyglycol-ether (50 mols of ethylene oxide) and 0.3 g. of the dyestuff described in Example 2, and has been adjusted to pH 4–5 with acetic acid. The bath is heated to 98° C. over the course of 30 minutes and kept at this temperature for 60 minutes. Thereafter the fibres are rinsed and dried. A greenish-tinged yellow dyeing having very good fastness properties is obtained.

EXAMPLE 8

Acid-modified polyester fibres are introduced, using a liquor ratio of 1:10, into a perchloroethylene bath which per litre contains 1 g. of oleic acid ethanolamide, 1 g. of the reaction product of 1 mol of oleyl alcohol with 20 mols of ethylene oxide, 8 g. of water and 1 g. of glacial acetic acid, as well as 1 g. of the dyestuff from 1,3,3-trimethyl-5-benzyl-2-methylene - 2,3 dihydroindol-ω-aldehyde and 4-dodecyloxyaniline, mentioned in the table accompanying Example 1. The dyebath is heated to 100° C. for 60 minutes in a closed dyeing apparatus. Thereafter, the fibres are rinsed and dried. A yellow dyeing having good fastness properties is obtained.

EXAMPLE 9

The dyestuff from 1,3,3-trimethyl-5-benzyl-2-methylene-2,3-dihydroindol-ω-aldehyde and p-anisidine mentioned in the table accompanying Example 1 is converted into the dyestuff base in the usual manner. 25 parts of this dyestuff base are suspended in 150 parts of perchloroethylene and 65 parts of butyrolactone, followed by 15 parts by weight of 2-ethylcaproic acid, are added. The dyestuff dissolves to give a yellow colour shade. The solution is left stirring for a further hour at 50° C. and is filtered after having again been cooled to room temperature. A stable solution is obtained, which is outstandingly suitable for dyeing polyacrylonitrile materials from chloro-hydrocarbon solutions.

EXAMPLE 10

50 parts of a fibre yarn from anionically modified polyacrylonitrile are introduced, at 22° C., into a dyebath which consists of a mixture of 4 parts of the solution of dyestuff in perchloroethylene described in Example 9, 4 parts of oleic acid ethanolamide, 4 parts of the reaction product of 1 mol of oleyl alcohol with 20 mols of ethylene oxide, 1 part of glacial acetic acid and 8 parts of water in 983 parts of perchloroethylene. The bath is brought to 100° C. over the course of 30 minutes, whilst vigorously circulating the liquor, and is kept at this temperature for one hour. After this time, the liquor is separated off and the yarn is freed of adhering solvent in a stream of air. A yellow dyeing is obtained.

Patent Claims:

1. Methine dyestuff of the formula:

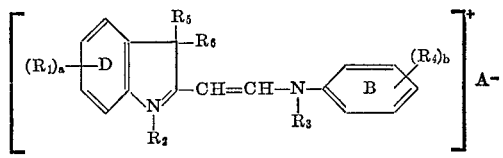

wherein $R_1$ and $R_4$ represent halo, lower alkyl, cyclohexyl, alkoxy of 1–12 carbon atoms, nitro, carbalkoxy of 1–4 carbon atoms in the alkoxy portion, nitrilo, formyl, acetyl, n-propionyl, iso-propionyl, toluyl, benzoyl, formylamino, acetylamino, n-propionylamino, benzoylamino, 4 - chloro - benzoylamino, 4-methyl-benzoylamino, carboxylic acid amide, carboxylic acid alkyl-anilide of 1–2 carbon atoms in the alkyl portion, sulphonic acid amide, methylsulphonyl, ethylsulphonyl, phenylsulphonyl, carboxylic acid alkylamide of 1–2 carbon atoms in either or both of the alkyl portions, sulphonic acid alkylamide of 1–2 carbon atoms in either or both of the alkyl portions, trifluoromethyl, phenylalkyl of 1–3 carbon atoms in the alkyl portion, substituted phenylalkyl of 1–3 carbon atoms in the alkyl portion wherein the substituents are attached to the phenyl nucleus and are selected from the group consisting of lower alkyl, halo, nitrilo, nitro, hydroxyl, lower alkoxy, formylamino, acetylamino, n-propionlylamino, benzoylamino, 4-chloro-benzoylamino, 4-methylbenzoylamino, and carbalkoxy of 1–4 carbon atoms in the alkoxy portion; with the provision that at least one of $R_1$ and $R_4$ is said phenylalkyl or said substituted phenylalkyl; and that $R_4$ additionally represents amino;

$R_2$ represents hydrogen, lower alkyl, cyclohexyl, aromatic carbocycle of 6–10 carbon atoms and substituted aromatic carbocycle of 6–10 carbon atoms where the substituents are selected from the group consisting of chloro, bromo, fluoro, ethyl, methyl, methoxy, carbonmethoxy, nitro, and nitrilo, and $R_2$ additionally represents phenylalkyl of 1–3 carbon atoms in the alkyl portion, and substituted phenylalkyl of 1–3 carbon atoms in the alkyl portion, and substituted phenylalkyl of 1–3 carbon atoms in the alkyl portion where the substituent is attached to the phenyl nucleus and is selected from the group consisting of lower alkyl, halo, nitrilo, nitro, hydroxyl, lower alkoxy, formylamino, acetylamino, n-propionylamino, benzoylamino, 4-chlorobenzoylamino, 4-methylbenzoylamino, and carbalkoxy of 1–4 carbon atoms in the alkoxy portion;

$R_3$ represents hydrogen, lower alkyl, or lower alkylene of 2–3 carbon atoms when joined to ring B ortho to the carbon to which the nitrogen is attached to form a 5-membered or 6-membered ring, which ring may be unsubstituted or substituted by lower alkyl;

$R_5$ and $R_6$ represent lower alkyl, cyclohexyl, phenylalkyl of 1–3 carbon atoms in the alkyl portion, or unsubstituted phenylalkyl of 1–3 carbon atoms in the alkyl portion where the substituent is attached to the phenyl nucleus and is selected from the group consisting of lower alkyl, halo, nitrilo, nitro, hydroxyl, lower alkoxy, formylamino, acetylamino, n-propionylamino, benzoylamino, 4-chloro-benzoylamino, 4-methyl-benzoylamino, and carbalkoxy of 1–4 carbon atoms in the alkoxy portion; a and b represent the numbers 0, 1, 2 or 3;

A represents an anion; and wherein the aromatic carbocyclic rings of the dyestuff can contain further non-ionic substituents, and the rings B and D can be condensed with carbocyclic rings.

2. Methine dyestuff of the formula

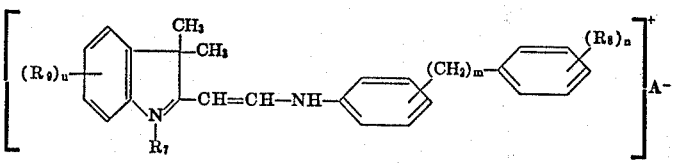

wherein $R_7$ represents methyl, ethyl or benzyl, $R_8$ represents identical or different methyl, ethyl, hydroxyl, methoxy, ethoxy, acetylamino, benzoylamino, nitro, or chloro, $R_9$ represents identical or different methyl, ethyl, cyclohexyl, methoxy, ethoxy, dodecyloxy, acetylamino, nitro, carbomethoxy, carboethoxy, carboxylic acid amide, carboxylic acid methylanilide, carboxylic acid ethylanilide, sulphonic acid amide, methylsulphonyl, phenylsulphonyl, nitrile, trifluoromethyl, chloro, bromo, or fluoro, $m$ represents the numbers 1 or 2, $n$ represents the numbers 0, 1, 2 or 3, $u$ represents the numbers 0, 1, 2 or 3 and $A^-$ represents an anion.

3. Methine dyestuff of the formula

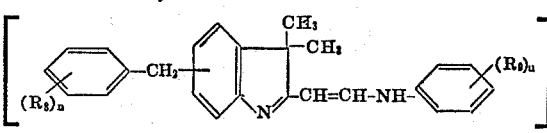

wherein $R_7$ represents methyl, ethyl or benzyl, $R_8$ represents identical or different methyl, ethyl, hydroxyl, methoxy, ethoxy, acetylamino, benzoylamino, nitro or chloro, $R_9$ represents identical or different methyl, ethyl, cyclohexyl, methoxy, ethoxy, dodecyloxy, acetylamino, nitro, carbomethoxy, carboethoxy, carboxylic acid amide, carboxylic acid methylanilide, carboxylic acid ethylanilide, sulphonic acid amide, methylsulphonyl, phenylsulphonyl, nitrile, trifluoro-methyl, chloro, bromo, or fluoro, $n$ represents the numbers 0, 1, 2 or 3, $u$ represents the numbers 0, 1, 2 or 3, and $A^-$ represents an anion.

4. Methine dyestuff of the formula

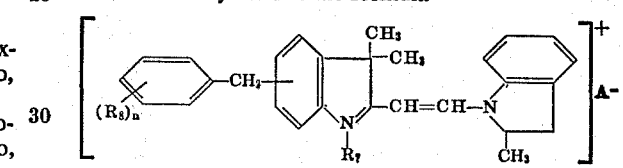

wherein $R_7$ represents methyl, ethyl or benzyl, $R_8$ represents identical or different methyl, ethyl, hydroxyl, methoxy, ethoxy, acetylamino, benzoylamino, nitro, or chloro, $n$ represents the numbers 0, 1, 2 or 3 and $A^-$ represents an anion.

5. Methine dystuff according to claim 2, wherein $R_7$=methyl.

6. A methine dystuff of the formula

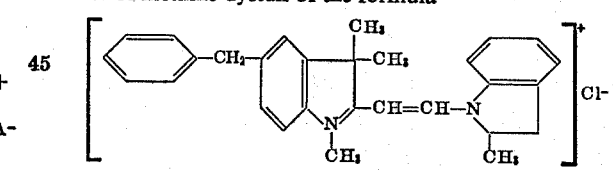

7. A methine dyestuff of the formula

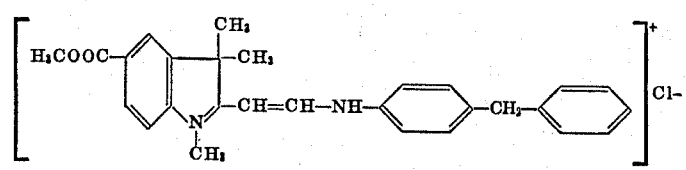

8. A methine dyestuff of the formula

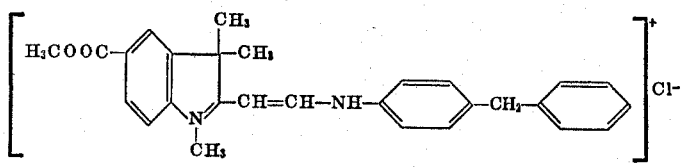

9. A methine dyestuff of the formula

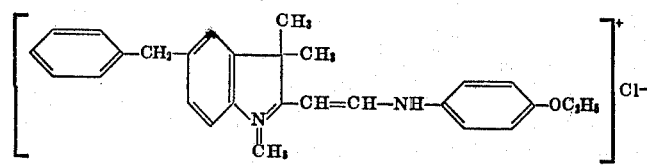

10. A methine dyestuff of the formula
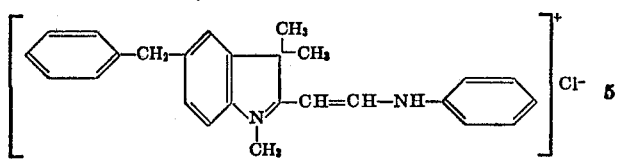
References Cited
UNITED STATES PATENTS
2,155,447  4/1939  Roth et al. _____ 260—240 E X
3,514,453  5/1970  Spatz et al. _____ 260—240 E
FOREIGN PATENTS
1,214,896  11/1959  France _____ 260—240 G
JOHN D. RANDOLPH, Primary Examiner
U.S. Cl. X.R.
8—3, 12, 22, 54.2, 62, 177 R, 178 E, 178 R; 106—176; 260—326.11

UNITED STATES PATENT OFFICE
CERTIFICATE OF CORRECTION

Patent No. 3,759,902            Dated September 18, 1973

Inventor(s) Hans-Peter Kuhlthau et al

It is certified that error appears in the above-identified patent and that said Letters Patent are hereby corrected as shown below:

Column 4, line 1, "deying" should read --dyeing--.

Column 12, line 19, "polycarylo-" should read --polyacrylo- ---.

Column 17, Claim 3, in the formula,

"  " should read

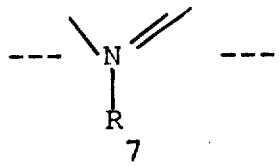

Column 18, Claim 8 in the formula, Delete "H$_3$ COOC-".

Signed and sealed this 31st day of December 1974.

(SEAL)
Attest:

McCOY M. GIBSON JR.         C. MARSHALL DANN
Attesting Officer           Commissioner of Patents